United States Patent
Morgan

(10) Patent No.: US 6,293,045 B1
(45) Date of Patent: *Sep. 25, 2001

(54) BIODEGRADABLE MULCH MAT

(76) Inventor: Albert W. Morgan, 317 E. Jefferson, Clinton, IL (US) 61727

( * ) Notice: Subject to any disclaimer, the term of this patent is extended or adjusted under 35 U.S.C. 154(b) by 0 days.

This patent is subject to a terminal disclaimer.

(21) Appl. No.: 09/435,136

(22) Filed: Nov. 5, 1999

Related U.S. Application Data

(63) Continuation-in-part of application No. 09/003,292, filed on Jan. 5, 1998, now Pat. No. 6,029,395.

(51) Int. Cl.$^7$ .................................................. C09K 17/52
(52) U.S. Cl. ................................................. 47/9; 47/1.01 F
(58) Field of Search ...................................... 47/9, 1.01 F

(56) References Cited

U.S. PATENT DOCUMENTS

| | | |
|---|---|---|
| 3,387,405 | 6/1968 | Iwasyk et al. . |
| 3,805,446 * | 4/1974 | Aoyagi ........................................ 47/9 |
| 3,812,615 | 5/1974 | Jamison . |
| 3,871,130 | 3/1975 | Lavo et al. . |
| 3,889,417 | 6/1975 | Wood et al. . |
| 4,067,140 | 1/1978 | Thomas . |
| 4,297,810 | 11/1981 | Hansford . |
| 4,339,890 | 7/1982 | Koenig . |
| 4,369,054 | 1/1983 | Shinholster, Jr. et al. . |
| 4,414,776 | 11/1983 | Ball . |
| 4,686,790 | 8/1987 | Lahalih et al. . |
| 4,910,052 | 3/1990 | Caldwell . |
| 5,082,500 | 1/1992 | Nachtman et al. . |
| 5,163,247 | 11/1992 | Weber et al. . |
| 5,389,116 * | 2/1995 | Byrd . |
| 5,464,878 | 11/1995 | Nemphos et al. . |
| 5,490,351 * | 2/1996 | Molnar et al. ........................... 47/9 X |
| 5,585,150 | 12/1996 | Sheehan . |
| 5,607,494 | 3/1997 | Kim . |
| 6,029,395 * | 2/2000 | Morgan ....................................... 47/9 |
| 6,048,377 * | 4/2000 | Kviesitis ................................ 47/9 X |

FOREIGN PATENT DOCUMENTS

| | | |
|---|---|---|
| 3909955-A1 * | 10/1989 | (DE) . |
| 2676613-A1 * | 11/1992 | (FR) . |
| 2-117319 | 5/1990 | (JP) . |

* cited by examiner

Primary Examiner—Peter M. Poon
Assistant Examiner—Jeffrey L. Gellner
(74) Attorney, Agent, or Firm—Thomas E. Kelley

(57) ABSTRACT

Mulch mat comprising an air and water-permeable, light-impermeable, open celled, composite of granular material and biodegradable fibers in a binder matrix prepared from a foam precursor. Disclosed biodegradable fibers include cellulosic fibers such as shredded wood, straw, shredded paper, wood pulp, cotton fiber, shredded corn stalks and moss; protein fibers such as hair and gelatin; and synthetic polymer such as vinyl polymer fibers and polyamide fibers. Disclosed granular material includes milled hard vegetation such as corn cob, nut shells, seed hulls, seeds, bark and gourds; soil builders such as vermiculite, perlite, sand, diatomaceous earth and gypsum; nutrients such as nitrate compounds, potassium compounds and phosphorus compounds; soil conditioners such as limestone, sulfur and iron sulfate. Useful binders include polysaccharides, polyglycosides, vegetable gums, vinyl polymers, waxes and crosslinkable oils. Useful surfactants include saponin, e.g. extract of Yucca shidigera, and amine surfactants. Slurries of fiber, granular material, binder and surfactant are gas entrained, e.g. by whipping, to provide a foam which is applied to soil around seedlings; the foams dry to a durable, biodegradable mulch mat which suppresses weeds, builds soil, prevents erosion, conserves soil and water and improves soil temperature providing an enhanced growing environment. The mat is effective in suppressing weeds growing below the mat in horticultural gardens. Seeds grown in or on top of the mat can penetrate the mat providing plants growing in artistic or information-conveying, patterned displays on mulch mat.

20 Claims, No Drawings

BIODEGRADABLE MULCH MAT

This is a continuation-in-part of Ser. No. 09/003,292, filed Jan. 5, 1998, now U.S. Pat. No. 6,029,395.

BACKGROUND

Various materials have been used as agricultural and horticultural mulch to enhance plant growth and improve soil, e.g. by conserving water, elevating soil temperature, controlling weeds, and adding organic mater to soils. Such materials have included straw, composted matter, manure, shredded bark and wood, fabric and plastic film. A decision to use mulch is usually based on the ability to achieve improvements over non-mulching agriculture practices which may require intense cultivation to control weeds and conserve water. Among the common mulch materials, plastic film is preferred for use with many cash crops, e.g. vegetables and ornamentals, due to its low cost and effectiveness in weed control and elevating soil temperature. Among the disadvantages of plastic film are poor distribution of irrigated water and the need to strip the film from fields after the growing season. Moreover, plastic film does not improve soil as organic mulch materials can do when incorporated into the soil. A soil with preferred tilth may comprise equal volumes of air, aggregate, organic matter and water. An advantage of a biodegradable mulch mat is that it can contribute to a preferred level of tilth when incorporated into the soil.

Likewise, in horticulture a variety of materials have been used to improve the aesthetic appearance of landscaping, suppress weeds and conserve moisture in soil around ornamental plants. Such materials include peat moss, chopped bark, shredded wood, compost, gravel and the like. Each of the materials has one or more deficiencies, e.g. with regard to weed suppression, moisture retention, biodegradation and appearance.

Jamison discloses in U.S. Pat. No. 3,812,615 a foamed material comprising fiber and an epoxy-crosslinked, acrylic polymeric binder intended as an agricultural mulch. The epoxy crosslinker renders the binder relatively non-biodegradable. And, as disclosed in comparative Example 13, such foamed material is not effective in suppressing weeds.

SUMMARY OF THE INVENTION

This invention provides a biodegradable mulch mat which is readily applied to soil or garden areas, e.g. as an aqueous foam, and provides desirable conservation of water, weed control and soil temperature maintenance. The mat comprises an open cell structure which is air and water permeable which provides superior distribution of natural or irrigated water to the soil and desired oxygen access to the soil. In preferred aspects of this invention the mulch mat exhibits the unique property of high water absorption and retention as well as high water permeability after saturation. Although the mat has an open cell structure, it exhibits superior weed suppression. The mat comprises biodegradable fiber and granules held together in an open cell structure by a biodegradable binder which is more readily decomposed by microorganisms than the fiber and granules. The choice of binder allows design of a mat with a desired cycle life ranging from a few months for agricultural applications to years for horticultural applications. The use of biodegradable materials allows a used mulch mat to be turned into the soil to build tilth by increasing soil openness and adding organic matter.

Although the mulch mat is useful in suppressing the growth of weeds from beneath the mat, the mat has the surprising advantage of permitting seeds to take root through the mat from above, e.g. from a seed-germinating medium on the surface of the mat. In other aspects of the invention the mulch mat can comprise useful additives for agriculture and horticulture applications; such additives can comprise surfactants, soil builders, plant nutrients, soil conditioners, fungicides, bactericides, nematocides and the like.

The mulch mat is a tough, durable unitary structure which can be applied to a variety of two-dimensional or three-dimensional surfaces including tilled soil, slopes and mounds, natural gardens, rocks, metal frames, lattice, timbers, pots and the like. Especially for horticulture applications the mulch mat can be applied in a variety of colors to aesthetically complement or coordinate with the local environment or plantings. This is an advantage when plants growing in a mulch mat are arranged in an artistic or information-conveying, patterned display, especially for multi-color presentations.

This invention also provides horticultural gardens comprising horticultural plantings in the biodegradable mulch mat, including vegetable and flower gardens, landscaping, tree and shrubbery nurseries, etc. Such a garden can be prepared by applying foam around the stalks of plants or seedlings, by inserting plants through holes in a preformed mulch mat or by applying seed and growing media to the surface of a mulch mat. The mulch mat can be colored, e.g. with mineral or plant colorants, to enhance the aesthetic effect of the garden.

DETAILED DESCRIPTION OF PREFERRED EMBODIMENTS

As used herein the term "percent solids" is based on all non-liquid, air-free, components of a formulation. As exemplified herein, the components of slurries useful for making foams which are precursors to mulch mats are typically solid or can be dried to a solid or non-aqueous liquid of high vapor pressure; thus, the "percent solids" represent the non-water components.

The biodegradable mulch mat of this invention can be prepared from a foamed dispersion of biodegradable fibers, granules, binder and other additives. When the wet foam dries, the mulch mat is formed with fibers and granular material maintained in an open celled composite structure by binder. Such open celled mats are permeable to water and air and impermeable to light. Mulch mats prepared without fiber or without granular material tend to have undesirable properties, e.g. high frangibility or impermeability. For instance, mulch mats prepared without granular material tend to have the properties of paper mache without an open celled structure. Very thin mache mats are so open to light as to be ineffective in suppressing weeds. Thicker mache mats tend to be excessively frangible and prone to cracking resulting in high weed growth through cracks. Very thick mache mats while durable tend to be highly impermeable which does not enhance plant growth. As illustrated in comparative Example 13, below, a fiber mat prepared from a foam with an epoxy-crosslinked binder is durable but so open-celled as to be relatively ineffective in suppressing weeds.

The mulch mats of this invention comprise biodegradable fibers which can be natural or synthetic fibers, e.g. cellulosic fibers, protein fibers or synthetic polymer fibers. Natural fibers can comprise pulped or shredded cellulose fibers such as wood pulp, shredded wood, shredded paper (tissue, newsprint and the like), straw, cotton fiber, composted vegetation, fibrous sphagnum moss, peat moss, shredded stalks including shredded corn stalks and shredded pine straw (including needles, twigs, cones and small branches). Shredded vegetation is preferably dry before shredding. Protein fibers can comprise as hair or gelatin. Biodegradable synthetic fibers can comprise reconstituted cellulose fibers such as rayon fibers, vinyl polymer fibers such as fibrous polyvinyl alcohol and polyamide fibers. In preferred embodiments of this invention the mulch mats will comprise fiber having a high aspect ratio of length to diameter, e.g. of at least 3, more preferably of at least 10 and even more preferably of at least 30. In general fine fibers, e.g. from shredded newsprint, are preferred due to the low cost of shredded newsprint and because of the superior performance of such over larger fibers such as straw. Because the black inks in newsprint are typically biodegradable, shredded newsprint with black ink is preferred over newsprint with colored ink. Even more preferred is unprinted, shredded newsprint, e.g. overstock, leader or end of roll newsprint.

The biodegradable mulch mat of this invention also comprises granular material which can be biodegradable or not. Biodegradable granular material can comprise organic particulate prepared by milling hard vegetation such as wood, corn cob, nut shells, seed hulls including grains hulls and bean hulls, seeds including corn and soybean, gourds, bark, certain mosses, composted vegetation and the like. Preferred biodegradable granular materials include milled corncob, wood flour, and milled nut hulls. Non-biodegradable granular material can comprise particulate soil builders, nutrients and conditioners. Particulate soil builders can include mineral particles, for example milled vermiculite, perlite, sand, diatomaceous earth, gypsum and the like. Particulate nutrients can comprise nitrogen, potassium and phosphate compounds, e.g. ammonium nitrate, potassium nitrate and potassium phosphate. Particulate soil conditioners can comprise milled limestone, iron sulfate, sulfur and such materials.

Mulch mats are prepared from foamed slurries comprising fibrous and granular materials, binder and surfactant in an aqueous medium. The amounts of materials can vary widely depending on the application as illustrated herein. Useful foams for preparing effective mulch mats of this invention can be prepared in a wide range of formulations which can be readily determined by routine experimentation using the formulations set forth in the followings examples as a guide. For instance, on an air free basis useful slurries can comprise from about 5 to 35 weight percent solids. On a dry basis useful ranges are 1 to 12 parts by weight fiber, 1 to 50 parts granular material, 1 to 40 parts binder and 1 to 50 parts surfactant. In preparing such slurries the fibrous and granular material can be pre-coated with other components of the mat or foam precursor such as binder, surfactant foaming agent or other adjuvants, e.g. colorants, fungicides. For instance, non-water soluble binders such as beeswax or paraffin wax, can be applied to fibers or granular material as a pre-coat. For many formulations it is preferred to add such other components separately. Slurries of the components used to make mulch mats of this invention tend to be stable and can be stored for extended periods. Some of the organic components, e.g. surfactants and binders, can typically be readily attacked by microorganisms resulting in fermentation of stored slurries. Thus, it is preferred to add more readily biodegradable materials, e.g. surfactants, just prior to foam preparation and application. Moreover, because surfactants promote foam formation, it is especially preferred to add surfactant as a final ingredient after homogeneous slurries have been prepared by mixing the other components.

The amount and type of binder can vary depending on the properties desired in the mulch mat where the fibrous and granular materials are bonded into an open cell composite. Useful binders can comprise natural or synthetic polymeric materials, e.g. biodegradable polymers including polysaccharides such as starch, polyglycosides such as vegetable gum, synthetic polymers such as polyvinyl acetate. In many cases, e.g. where it is desired that mulch mats have a long life or enhanced resistance to severe wind and rain environments, it is useful to employ water repellent binders which can include crosslinkable vegetable oil such as linseed oil, gum arabic or guar gum or other water repellent materials such as camphor, rosin gum, pine tar, paraffin wax, beeswax, asphalt emulsion, vinyl polymer emulsions or acrylic polymer emulsions. A preferred water-repellent binder is polyvinyl acetate. In addition to binding fibrous and granular material such polymer can serve to thicken solutions from which foams are produced, e.g. to improve pumpability or foaming through increased viscosity. Factors affecting the life of mulch mats, e.g. resistance to biodegradation, include the type of binder, the amount of binder, e.g. in proportion to the amount of solid fibrous and granular materials, mat thickness and mat density. A person skilled in the art should be able to design a mulch mat with a desired product life through routine experimentation. For instance, mulch mat life can be readily designed to be short, e.g. 3 to 6 months, or long, e.g. up to 3 years or more.

Cohesive mulch mat is also especially useful for retaining soil against erosion, e.g. on slopes, in drainage ditches, on riverbanks, at construction sites and the like. Mulch mat precursor foams can be readily formulated to have a sufficiently high slump factor so that the applied foam will remain in place on a sloped surface and dry into an open celled mulch mat on slopes of up to 45° or more, for instance on vertical surfaces. As will be explained below, an erosion retaining mulch mat can be prepared with water repellent binder for long term use in a soil retaining application or can be prepared with less durable binder for more temporary use, e.g. on construction sites. The mulch mat in soil retention applications can be used as is over wide areas of soil, used around plantings such as soil retaining trees or shrubbery, or used as a seed bearing mat for planting of soil control plants such as crown vetch, grasses and the like. The use of mulch mat in seed bearing applications is explained in more detail below and in the illustrative examples. Damage to a mulch mat, e.g. deliberate holes made for inserting plants through the mulch mat or accidental holes made from falling branches, can be repaired by an overcoat of foam.

An advantage of using water soluble polymer binder is that a certain amount of binder tends to leach from the foam as the foam is applied resulting in a bonding between the mat and a top layer of soil, e.g. about ¼ to ½ inch deep. The extended soil mat interface assists in holding a mulch mat to sloped terrain. Leached binder also promotes unification of the top layer of soil under the mulch mat.

The amount of surfactant used will depend on its ability to promote foam formation by reducing the surface tension of the liquid medium of dispersed material. Useful surfactants include saponins, fatty acid amine oxides and fatty acid amine adducts. Because surfactants are relatively small molecules which can leach from a mulch mat, it is preferable to use a natural surfactant which is less damaging to root function than more conventional surfactants such as sulfonic acids. Preferred saponin surfactants include the steroidal saponins such as extracts from Yucca shidigera which not only is effective in generating a foam precursor for mulch mats but which is also effective in controlling plant root pests such as nematodes. Other useful amide surfactants are available from PPG including the Mazox brand amine oxides such as Mazox CAPA cocamidopropyl amine oxide (hereinafter"CAPA"), Mazox LDA lauramine oxide and Mazox CDA palmitamine oxide and the Mazamide alkanolamides such as Mazarnide 80 which is a 1:1 adduct of coconut oil: di-ethanolamine. Other useful surfactants include cocamidopropylaminobetaine, PEG(6) cocamide, sorbitan monostearate and cocamidopropylhydroxysultane. In selecting from among the various available surfactants, amide surfactants are generally more effective in foam formation but are more abusive to plants intended to be protected by the mulch mat. Although higher quantities of saponin surfactants may be required to produce a desired foam, the saponins are preferred because they are less abusive to desired plans.

The mulch mats of this invention can also comprise other adjuvants including, but not limited to, colorants, seeds, antioxidants, UV-absorbers and fungicides. Mulch mats can be provided in a variety of colors, e.g. for aesthetic landscaping or identification of treated soils. Mats made from shredded newsprint as the fiber source tend to be gray in color. Anti-oxidants such as BHA and BHT and UV-absorbers are useful in extending the life of mulch mats. The incorporation of fungicide into mulch mat is also useful to prevent premature degradation of the mulch mat from microorganisms in moist environments. Fungicides are selected on the basis of permitted use for selected plant applications, e.g. Dowacil fungicides for ornamental plant applications. Useful fungicides for vegetable applications include quaternary ammonium compounds.

Colored mulch mat can be provided by adding any of a wide variety of natural dyes or pigments. Iron compounds, e.g. oxides, sulfates and natural mixed oxide ores such as magnetite, umber, burnt umber, sienna and ocher are useful pigments which can be used to provide a spectrum of colors including black, gold, brown, red and yellow tones. Ferrous sulfate is also useful as a mordant for binding dyes to the fibrous component of the mulch mat for long lasting color. Ferrous sulfate can also serve as a soil amendment for modifying pH of highly alkaline soils. Other useful mineral colorants include calcites and clays. Color can also be imparted by adding natural dyes found in the roots, leaves and flowers of a wide variety of plants. Selection of a preferred natural dye will usually depend on the local availability of dye-bearing plants or processed plant residue, e.g. grape or beet pulp. While a person skilled in the art can readily determine natural dyes available in any geographical area, the following list illustrates the diversity of available natural plant-derived dyes. Natural coloring from a plant will vary with plant part, fibrous substrate, mordant, pH, season and locale. Some plants listed will also provide other strikingly different colors and many more suitable plants in certain locations are not listed.

| Color | Plants |
| --- | --- |
| black | alder, black walnut, queen of the meadow |
| blue | elder, woad, cabbage |
| brown | burdock, comfrey, geramum, calliopsis |
| gold | goldenrod, mullein, onion, yarrow, zinnia |
| gray | poplar, sunflower |
| green | fennel, foxglove, St.-John's Wort, sage, lily of the valley |
| orange | chicory, golden marguerite, calendula, carrot |
| pink | bloodroot, pokeweed, sorrel, strawberry, beets, mushroom |
| purple | blackberry, grape, lady's bedstraw, elderberry, |

-continued

| Color | Plants |
| --- | --- |
| red | dandelion, madder, safflower,sweet woodruff |
| tan | barberry, raspberry, butternut |
| yellow | salsify, marigold, tansy, mustard, apple, weld |

The mulch mat of this invention is effective in suppressing growth of plants from seed from beneath the mat due to the light impermeability of such mat. In general, seeds incorporated into a mulch mat will not grow unless they are located sufficiently close to the top surface that the cotyledon is exposed to light or unless a coarse, open celled mat is used. For instance, when shredded pine straw (comprising shredded pine needles, cones, twigs and branches) is used as a source of fiber, the mulch mats are more conducive to being an effective seed germination mat than when shredded newspaper is used as the source of fiber. The germination and successful growth of seeds within a mulch mat is also enhanced in proportion to the size and number of seeds, e.g. pumpkin or squash seeds are more likely to survive than smaller seeds. The mulch mat is also effective in suppressing growth of fugitive seed landing on the mat. Surprisingly, however, the mat can support germination and growth of seeds in a growing media located on the top surface of a mulch mat. For instance, seeds which are sown in a moist potting soil mix placed on the surface of mulch mat can germinate and have roots penetrate the open cell structure of the mulch mat and grow into the subsoil. This property is useful in cases where it is desirable to establish vegetation on soil that is ripe with undesirable seeds and on highly sloped soils where the mulch mat can retard erosion. For instance, a mixture of seed and potting soil can be broadcast onto a freshly applied mulch mat on a highly sloped surface.

Open cell mulch mats are prepared by applying a liquid foam comprising a gas-entrained, dispersion of fibrous and granular material to the surface of the soil to be covered, e.g. around the stalks of plants such as emerging flower or vegetable plants, shrubbery, trees, etc. An aqueous foam can be prepared by entraining a gas, e.g. air or carbon dioxide, in a dispersion of fibrous and granular material in an aqueous liquid medium containing surfactant and polymeric binder. One method of preparing a foam is to whip a slurry comprising fiber, granular material, binder and surfactant with a high-speed mixer, e.g. a plurality of rods extending from a central shaft. An illustrative simple apparatus for creating foams is the ubiquitous high-speed kitchen blender which is useful for preparing small quantities of foams for small applications or development of foam formulations. Larger scale foaming can be effected by high speed mixing of surfactant-containing slurries. In some cases foaming is enhanced when gas pressure is applied to the surface of the mixing slurry or when the gas is injected below the surface of the mixing slurry. Another method is to inject the foaming gas into the slurry passing through an application nozzle. Where unfoamed slurries will have a specific gravity of about 1 g/cc, the foams will have a specific gravity in the range of 0.1 to about 0.3 g/cc. Although foams cannot be readily drawn or sucked into a conduit, foams are readily pushed through a conduit. Thus, a preferred pump for preparing and/or transporting a foam will have an open impeller on a submerged pump. Foam transportation into a pump suction can be assisted by increasing the liquid head of the foam by applying gas pressure to the surface of the foam within a closed vessel. Such foams are not only useful in providing open cell mulch mats of this invention but such foam is also useful for repairing damaged or torn mulch mat.

Foams as prepared and applied to the surface of a growing medium will shrink as the fibers and granular material are combined into a cohesive, open-celled composite. Although preferred thickness of foams will vary depending on factors such as percent solids, quantity of binder and the like, in general foams for light, e.g. greenhouse, applications can be applied thinner than for more severe, e.g. open field, applications. For instance, for greenhouse applications it may be adequate to apply foam at 2 to 3 cm thick where the same foam should be applied at 2–8 cm thick for field applications. The mulch mat of this invention will be effective in suppressing weed growth unless the integrity of the mat is compromised, e.g. by cracks, biodegradation or soil deposition on the top surface of the mat. For instance, a foam of about 34% solids applied at about 3 cm high will typically reduce to a mulch mat having a dry height in the range of 0.5 to 1.5 cm. Such foam dries to a tough, open cell layer of a composite of fibrous and granular material bonded together by the polymer binder. An open-celled, mulch mat can assist in distributing irrigation water and rainwater, preventing erosion, and holding water for slow release by wicking retained water to the subsoil. For instance, a mat according to this invention can absorb and hold about 2 to 3 times its weight of water or more. A mulch mat can be provided in a desired thickness in proportion to the rate of application of foam to the underlying area of subsoil and the concentration of fibrous and granular material in the foam. The foams of this invention will comprise on an air-free weight basis about 5 to 35 weight percent solids, for weed suppression preferably at least about 7 weight percent, more preferably in the range of 10 to 25 weight percent solids. As a guide for preparing mulch mat for evaluation using newsprint as a source of fiber, it is useful to know that one double page of newspaper 68×58 cm (27×23 inches) weighs about 20 g and will cover an area of 0.4 square meters (4.3 sq ft). Thus, 1000 g of a foamed slurry at 5.4% newspaper concentration (54 g of shredded newspaper fiber) will cover 1 m² (10.8 sq ft) of soil at an equivalent of single sheet coverage. As a rule of thumb, mulch mats providing the equivalent of double sheet coverage—about 108 g of shredded newspaper fiber per square meter of mulch—provides fair weed suppression. Mulch mats providing the equivalent of triple sheet coverage—about 160 g of shredded newspaper fiber per square meter of mulch—gives excellent weed suppression. The application of a certain amount of shredded newspaper fiber per square meter of soil can be effected by using higher solids formulations or by multiple coatings of foam. It should be understood that the addition of granular materials enhances the weed suppression effect of a mulch mat so that lower amounts of fiber can be used to achieve the desired high degree of weed suppression.

With a wide variety of components from which to choose useful foams for mulch mats can be prepared from slurries prepared from a variety of components in widely varying formulations. For instance, a low solids slurry (6%) is useful for suppressing weed growth and growing seed sown over the mulch mat and a high solids slurry (18%) is especially useful in suppressing weed growth. Exemplary low and high solids slurries can be prepared with the following formulations:

| Component | low solids parts by weight | high solids parts by weight |
| --- | --- | --- |
| corn starch | 0.25 | 2.8 |
| shredded newsprint | 2.5 | 3.2 |
| Yucca shidigera extract (50%) | — | 6.9 |
| CAPA | 0.8 | — |
| wheat flour | 0.9 | 1.4 |
| milled corn cob (100–80 mesh) | 1.6 | 4.1 |
| polyvinyl acetate emulsion (3.5%) | — | 5.5 |
| guar gum | 0.15 | — |
| fungicide | 0.006 | — |
| water | 94 | 78.2 |
| solids | 6% | 18% |

Mulch mats of this invention will preferably have a high cohesiveness as measured by a dropped dart, e.g. a 28 gram dart. Useful mulch mats will survive dart impact testing without cracking with impact stress of about 0.4 kilogram-meters (3 foot pounds) or more.

The following specific examples are presented to more particularly illustrate the invention and should not be construed as being limitations on the scope and spirit of the invention.

EXAMPLE 1

This example illustrates the preparation of an embodiment of a foam of this invention useful for casting biodegradable mulch mats. Foam slurries were prepared by combining water, Yucca shidigera extract steroid saponin (50% in water), wheat flour binder, shredded newsprint fiber and ground corn cob (80 mesh) granular material in the proportions listed in Table 1 and whipping for 60 seconds in a kitchen-type blender. Each formulated foam was poured in a layer about 2.5 cm thick over separate seeded trays containing about 100 seeds of annual rye grass, 50 seeds of collards and 50 seeds of lettuce and allowed to dry to a mulch mat. The mulch mat-covered trays and a control tray were maintained at 70° C., illuminated by artificial light from growth lamps and watered to saturation weekly. The periodic seedling count for each tray which is reported in Table 1 illustrates the effectiveness of the mulch mats of this invention in suppressing subsoil seed growth. Also illustrated is the synergistic effect of combining both fibrous and granular materials in a mulch mat as compared to the use of either fiber or granular material alone.

TABLE 1

| Component | Sample 1-A | Sample 1-B | Sample 1-C | Control |
| --- | --- | --- | --- | --- |
| Deionized water | 180 grams | 180 grams | 180 grams | |
| Yucca extract | 20 | 20 | 20 | — |
| Wheat flour | 4 | 4 | 4 | — |
| Shredded newsprint | 20 | — | 10 | — |
| Ground corn cob | — | 20 | 10 | — |
| Days after mulching | | Seedling Count | | |
| 7 | 0 | 14 | 0 | 21 |
| 14 | 9 | 20 | 0 | 39 |

TABLE 1-continued

| | Sample 1-A | Sample 1-B | Sample 1-C | Control |
|---|---|---|---|---|
| 21 | 12 | 27 | 0 | 95 |
| 28 | 13 | 30 | 2 | >100 |

EXAMPLE 2

This example illustrates the effectiveness of fine fiber in the mulch mat of this invention as compared to larger fiber, e.g. pine straw. The procedure of Example 1 was followed except that the fiber and granular material used in the foam formulations was as specified in Table 2 where pine straw is a shredded mixture of white pine needles, cones, twigs and branches.

TABLE 2

| | Sample 1-A | Sample 1-B | Sample 1-C | Control |
|---|---|---|---|---|
| Component | | | | |
| Deionized water | 180 grams | 180 grams | 180 grams | |
| Yucca extract | 20 | 20 | 20 | — |
| Wheat flour | 4 | 4 | 4 | — |
| Shredded newsprint | — | — | 10 | — |
| Ground corn cob | — | 20 | 10 | — |
| Days after mulching | | Seedling Count | | |
| 28 | 50 | 15 | 2 | <100 |

EXAMPLE 3

This example illustrates a variety of binders that are effective in producing water resistant mulch mats. A slurry was prepared using the components identified in the formulation described in Table 3. The slurry was whipped in a blender for 60 seconds into a foam, poured onto a porous tray and allowed to dry to form an open-celled mulch mat. A 2.5 cm cubic sample of the mat was immersed in a 100 ml volume of water for 14 days then air dried with retention of the open cell structure illustrating the effectiveness of the binders in producing a water repellent mulch mat. The procedure was repeated substituting each of beeswax, pine tar, gum arabic, rosin gum, camphor, guar gum and corn starch for the paraffin wax component; each of the resulting mulch mat samples remained intact with an open cell structure after the 14 day immersion except for the corn starch-containing mat which disintegrated after 3 days immersion.

TABLE 3

| Component | parts by weight |
|---|---|
| paper slurry (1.72%) | 140 |
| wheat flour | 5 |
| CAPA surfactant | 30 |
| water | 42 |
| paraffin wax | 10 |

EXAMPLE 4

This example illustrates the preparation of a water resistant mulch mat in larger volume apparatus. A cellulose slurry was prepared by adding 50 g of toilet paper to 2 kg of water which was circulating (via a ⅓ horsepower sump pump) in a 113 liter (30 gallon) drum. The following components were mixed and added to the fiber slurry:
 67 g of starch in 360 g water
 532 g of corn cob flour (180-80 grade)
 266 g of polyvinyl acetate (30% emulsion in water)
 67 g of guar gum
 266 g of CAPA surfactant
 1500 g water The resulting slurry comprised about 25% solids and was not readily converted to a foam by continued pumping. Additional water was added to produce a slurry of about 23% solids which was converted to what is characterized as a "poor" foam. Still more water was added to produce a slurry of about 20% solids which could be mixed by additional pumping to produce what is characterized as a "good" foam. Even more water was added to produce a slurry of about 13% solids which could be mixed to produce what is characterized as a "superior" foam.

EXAMPLE 5

This example illustrates the use of a straw-fibered mulch mat prepared with Yucca extract surfactant as a seeding aid for certain plants. A slurry was prepared using the components indicated in Table 5A (where pine straw is described in Example 2) and aliquots of the slurry were mixed with a quantity (50–100) seeds of a variety of species. Flats were prepared with bedding mix and fertilizer and watered. The seed-mixed slurries were whipped to a foam and applied in 2.5 cm (1 inch) dots on the bedding mix to provide areas of seed-containing mulch mat. As a control the same amount of each variety of seeds per unit area was applied without foam on the bedding mix. The amount of germination after 3 weeks is reported in Table 5B. The pine straw used in the Example 5 is a coarser fiber than newspaper fiber. Thus, pine straw-based mulch mat can have open cells which are larger than the open cells provided in newspaper fiber-based mulch mat. As will be seen in Example 6 below, foam precursor of the finer cell-sized, newspaper-based, mulch mat is typically not as effective as a seeding medium as is the foam precursor of a pine-straw-based mulch mat.

TABLE 5A

| Component | parts by weight |
|---|---|
| water | 3500 |
| pine straw | 500 |
| corn starch | 6 |
| dried milk | 6 |
| wheat flour | 6 |
| guar gum | 6 |
| Yucca extract | 50 |
| Milled corn cob | 100 |

TABLE 5B

| | Percent germination | |
|---|---|---|
| Seed species | Seed alone | Seed in foam |
| alyssum | 90 | 35 |
| zinnia | 70 | 40 |
| marigold | 4 | 4 |
| ageratum | 0 | 40 |
| centaurea | 50 | 50 |

TABLE 5B-continued

| Seed species | Percent germination | |
|---|---|---|
| | Seed alone | Seed in foam |
| dianthus | 60 | 60 |
| snapdragon | 0 | 0 |
| parsley | 0 | 0 |
| lettuce | 90 | 90 |
| thyme | 95 | 95 |
| radish | 7 | 5 |
| basil | 60 | 60 |
| shallots | 0 | 0 |

EXAMPLE 6

This example illustrates the use of newspaper fiber-based mulch mat in germination of seed which is applied mixed into a foam and seed which is applied on top of an applied foam. A slurry was prepared using the components listed in Table 6 and whipped into a foam; rye grass seed was admixed into one of the foams.

TABLE 6A

| Component | Slurry 6-A | Slurry 6-B |
|---|---|---|
| water | 86 parts | 86 parts |
| starch | 4 | 4 |
| wheat flour | 4 | 4 |
| Yucca extract (50%) | 20 | 20 |
| 4.6% newsprint slurry | 50 | 50 |
| corn cob (180–80) | 6 | |
| rye grass seed | — | 5 |

Potting soil trays were filled with a perlite/peat moss seeding mixture, time release fertilizer and watered. Two of the trays (Tray 6-1 and Tray 6-2) were seeded with 5 grams of rye grass seed each. One of the seeded trays (Tray 6-1) was not covered with mulch. The other seeded tray (Tray 6-2) was covered with seed-free foam using Slurry 6-A which dried to a seed-free mulch. The tray with unseeded mixture (Tray 6-3) was covered with seeded foam using Slurry 6-B which dried to a seeded mulch. The results of germination are reported in Table 6B showing that foam slurry comprising fine fiber, e.g. from newsprint, is not effective for germinating rye grass seed.

TABLE 6-B

| | Percent Germination | | |
|---|---|---|---|
| Time after planting | Tray 6-1 no mulch | Tray 6-2 seed-free mulch | Tray 6-3 seeded mulch |
| 1 week | 5 | 0 | 0 |
| 2 weeks | 65 | 3 | 7 |
| 3 weeks | 90 | 7 | 11 |
| 4 weeks | 90 | 15 | 11 |

EXAMPLE 7

This example illustrates the effectiveness of a mulch mat of this invention in producing a higher yield of produce. A slurry was prepared from the components listed in Table 7. A foam produced by aerating the slurry with high speed mixing was applied to a plot of Hungarian pepper seedlings. In a comparative plot the soil was covered by a landscape fabric and in a control plot the soil was left uncovered as is done for hand cultivation. During the growing season all plots were treated with similar irrigation and environmental exposure. The advantages of using the mulch mat of this invention are illustrated by the results reported in Table 7.

TABLE 7

| Component | parts by weight |
|---|---|
| shredded newspaper | 4 parts |
| milled corn cob | 12 parts |
| Yucca shidigera extract | 20 parts |
| starch | 8 parts |
| flour | 4 parts |
| polyvinyl acetate | 10 parts |
| water | 42 parts |

| Type Mulch | plants Original-Lost = Survivors | | Total Wt | Peppers No. | Ave Wt | Total Wt. |
|---|---|---|---|---|---|---|
| Foam | 10 0 | 10 | 2126 g | 76 | 20.5 g | 1560 g |
| Fabric | 10 4 | 6 | 418 g | 12 | 15.5 g | 186 g |
| None | 12 10 | 2 | 137 g | 4 | 20 g | 80 g |

EXAMPLE 8

This example illustrates one method of preparing and applying a foamed slurry in the preparation of mulch mat of this invention. A 4 liter volume of a slurry comprising cellulose fiber, corn cob granules, wheat flour, corn starch and surfactant was placed into a pressure paint can which was sealed and pressurized to 6.8 atmospheres (100 psig) for 48 hours. The pressurized slurry was sprayed to provide a foam until the pressure was reduced to a gauge pressure of 0.8 atmospheres (12 psig).

EXAMPLE 9

This example illustrates the effect of high speed mixing time on the density of foamed slurries of this invention. A master batch of foam slurry was prepared using components listed in Table 9A. Aliquots of the slurry were placed into a 3.8 liter (1 gallon) container and whipped at 2500 rpm for various lengths of time producing foams with densities that decreased with mixing time as indicated in Table 9B.

TABLE 9-A

| Component | parts by weight |
|---|---|
| tissue paper | 80 |
| corn cobs(100-80R) | 50 |
| polyvinyl acetate | 20 |
| starch | 6 |
| dried milk | 6 |
| flour | 6 |
| CAPA | 88 |
| water | 3270 |

TABLE 9B

| Mixing time | Foam density | Expansion |
|---|---|---|
| 30 seconds | 0.22 g/ml | 4.6:1 |
| 40 | 0.23 | 4.4:1 |
| 60 | 0.12 | 8.5:1 |
| 90 | 0.094 | 10.9:1 |
| 120 | 0.076 | 13.4:1 |

EXAMPLE 10

This example illustrates the biodegradability of a mulch mat of this invention and its compatibility with perennial plants. In early June a foam prepared from the slurry of Example 9 whipped for 60 seconds to about 0.1 g/ml density was poured into a summer flower bed containing miniature roses, grape hyacinth, garden phlox, Morden's Gleam loosestrife, malva, and mums; the bed was covered with a 5 cm thick foam which contacted the plant stems. The foam dried in about 24 hours to a coherent mulch mat which effectively suppressed weed growth in the bed while the plants thrived through the fall of the year. The mulch mat degraded over the winter and the perennials in the beds grew in the spring.

EXAMPLE 11

This example illustrates the use of a mulch mat as a weed suppresser and support for a seeding mix of desired plants. Rye grass seed was applied to flats containing fertilized and watered potting mix. A slurry was prepared using the components indicated in Table 11A, whipped into a foam and applied at 2.5 cm thick to the surface of the rye grass-seeded flats and allowed to dry to a mulch mat. Seeds of various species were mixed with fertilized potting mix which was watered and applied in 2.5 cm dots in patterns on the top surface of the mulch mat-covered flats. After 4 weeks in a greenhouse the germination of rye grass and top-seeded species was observed as recorded in Table 11B.

TABLE 11A

| Component | parts by weight |
| --- | --- |
| water | 3500 |
| shredded newspaper | 100 |
| corn starch | 6 |
| dried milk | 6 |
| wheat flour | 6 |
| guar gum | 6 |
| CAPA | 42 |
| Milled corn cob | 60 |

TABLE 11B

| | Percent germination | |
| --- | --- | --- |
| Seed species | Seed species | Rye grass |
| marigold | 70 | 10 |
| ageratum | 65 | 0 |
| carrot | 80 | 5 |
| lettuce | 95 | 0 |
| cauliflower | 70 | 0 |
| spinach | 65 | 0 |
| radish | 75 | 5 |
| perennial rye | 95 | 10 |
| pumpkin | 70 | 0 |
| squash | 35 | 0 |
| corn | 30 | 5 |
| pepper | 20 | 5 |
| tomato | 25 | 0 |
| snapdragon | 55 | 10 |
| bachelor button | 75 | 5 |
| control | — | 5 |

EXAMPLE 12

This example illustrates the use of a mulch mat in a combination of ornamental landscaping. A 1.2 meter×2.4 meter (4 ft×8 ft) bed was seeded with onion sets in the pattern of the letters "C&A". A slurry was prepared having the composition indicated in Table 12. A 4 liter mixture of surfactant/binder/pigment comprising 1 liter of 50% Yucca extract, 1 liter of CAPA, 1 liter of polyvinyl acetate (Elmer's glue) and 1 liter aqueous dispersion of 28 g (1 oz) iron oxide pigment was mixed into 30 gallons of the slurry. The slurry was pressurized to 2 psig and applied as a foam over the onion set bed at 7.5 liters per minute (2 gpm). The onions penetrated the mulch mat forming the "C&A" pattern in a weed free bed. The yield of onions was about 20% higher than in a hand cultivated control plot.

TABLE 12

| Component | amount |
| --- | --- |
| water | 90000 g |
| shredded newspaper | 2400 g |
| corn starch | 240 g |
| wheat flour | 840 g |
| guar gum | 140 g |
| milled corn cob | 1500 g |
| Dowacil 75 fungicide | 6 g |
| CAPA | 754 g |

Comparative Example 13

This example illustrates a mulch mat of the prior art made with wood pulp fiber and an epoxy-crosslinked binder as disclosed in Example II of U.S. Pat. No. 3,812,615 and prepared by combining 190 parts water 22 parts of acetate grade wood pulp, 10 parts of Borden Chemical Co.'s acrylate emulsion copolymer of methylmethacrylate/methacrylic acid binder 1 part of Davcon "white epoxy" a water-dispersible epoxy crosslinker 1 part of sodium carboxymethyl cellulose thickener (CMC), 0.2 parts of sodium dodecylbenzenesulfonate emulsifier (DBS), and 0.1 parts of lauric diethanolamine wetting agent (LDA).

The formulation was mixed in a blender to a foam which was applied to a depth of about ⅜ inch thick over the soil around a lemon basil seedling in a planting tray of moist, fertilized, soil containing about 75 seeds of annual winter rye. Within 4 days the rye seeds had sprouted through the mulch and at 9 days the basil was covered in a bed of rye grass.

EXAMPLE 13

This example illustrates the superior efficacy of a mulch mat of this invention in controlling weeds as compared to the prior art. An aqueous foam was prepared by combining 208 parts water 15 parts of fiber 5 parts cotton fiber ⅜–½ inch long, 5 parts cotton fiber<200 micron long and 5 parts of chopped newsprint 3 parts of corncob dust, 2 parts of cornstarch binder, 2 parts dried milk binder 1.5 parts of coconut soap, 0.7 parts guar gum 0.25 parts Yucca Schdigera extract, 0.25 parts lime, and 5 parts of 20-20-20 fertilizer.

The formulation was mixed in a blender to a foam and applied to a depth of about ⅜ inch thick over the soil around a lemon basil seedling in a tray of moist, fertilized soil containing about 75 seeds of annual winter rye. At 4 and 9 days after planting, essentially no rye had penetrated through the mulch mat.

EXAMPLE 14

This example serves to illustrate the utility of the mulch mat of this invention in preparing durable, weed free, horticultural displays. A formulation as disclosed in Example 13 was colored red by the addition of 5 parts iron (III) oxide. The slurry was converted into a foam and applied to an area of about 7 meters by 15 meters on a sloping field; the foam was allowed to dry to a mat which was stable under foot traffic. A mixture of moist fertilized seeding mix consisting of peat moss, perlite, vermiculite and turnip seed was applied to the surface of the mulch mat in shapes at about 2 centimeters thick. One shape was the numeral "5" about two meters in height. Another shape was a silhouette of a pig about three meters in length and one meter in height. The seeds in the shaped seeding mix took root through the mulch mat to provide essentially weed-free patterns of green-colored leaves in the shapes of the numeral "5" and a pig silhouette.

The foam was used to apply a red mulch mat to several areas about 0.5 by 1.0 meter on a germination plot. Seedling mix with perennial rye grass was applied to some of the areas of the red mulch mat in the pattern of a smiley face; the rye grass bloomed to provide a green smiley face on a red mulch background. Seedling mix with alyssum seed was applied to some of the areas of the red mulch mat in the pattern of a smiley face; the alyssum bloomed to provide a white smiley face on a red mulch background.

While the invention has been described in detail and with reference to specific embodiments thereof, it will be apparent to one skilled in the art that various changes and modifications can be made therein without departing from the spirit and scope thereof.

What is claimed is:

1. A garden comprising horticultural plants growing through an air and water-permeable, weed-suppressing, biodegradable mulch mat comprising biodegradable fibers, granules and binder, wherein said binder is more readily decomposed by microorganisms than said fiber and granules and wherein said mulch mat is made from an aqueous foam.

2. A garden according to claim 1 wherein said surface of the mulch mat is substantially three-dimensional.

3. A garden according to claim 2 wherein said mulch mat provides erosion control for a sloped surface of ground.

4. A garden according to claim 1 wherein plants are arranged in a pattern.

5. A garden according to claim 4 wherein said plants are provided in a multi-color pattern.

6. A garden according to claim 1 wherein said mulch mat is multi-colored.

7. A garden according to claim 1 further comprising plants grown from a seed germinating medium on the surface of said mat wherein said plants have roots which penetrate said mat.

8. A garden according to claim 1 further comprising surfactant, soil builder, plant nutrient, soil conditioner, fungicide, bactericide or a mixture thereof.

9. A garden according to claim 1 wherein plants are in a pattern comprising one or more of a letter or a numeral.

10. A garden according to claim 1 wherein plants are a pattern comprising a silhouette.

11. A garden according to claim 1 wherein plants are in a pattern of a smiley face.

12. A method of horticultural planting comprising (a) arranging a multiplicity of plants in a pattern and applying a foamed, aqueous dispersion of biodegradable fiber, granules and binder to the surface of the soil around said plants so as to provide around said plants an air and water permeable, weed suppressing, biodegradable mulch mat, (b) applying to the surface of a mulch mat a multiplicity of seeds in plant growing media in a pattern, or (c) inserting plants through holes made in a mulch mat, thereby providing a horticultural garden according to claim 1.

13. A method according to claim 12 wherein said plants are in a pattern comprising one or more of a letter or a numeral.

14. A method according to claim 12 wherein plants are a pattern comprising a silhouette.

15. A method according to claim 12 wherein plants are in a pattern of a smiley face.

16. A method according to claim 12 wherein said mulch mat is air and water permeable and comprising biodegradable fibers, granules and binder and wherein the binder is more readily decomposed by microorganis the fibers and granules.

17. A method according to claim 12 wherein said plants are in mulch mat applied to a sloped surface.

18. A method according to claim 12 wherein said mulch mat is multi-colored.

19. A method according to claim 12 wherein said mulch mat further comprises surfactant, soil builder, plant nutrient, soil conditioner, fungicide or bactericide or a mixture thereof.

20. A method according to claim 12 wherein said plants are in a multi-colored pattern.

* * * * *